United States Patent [19]

Endou et al.

[11] Patent Number: 4,596,741
[45] Date of Patent: Jun. 24, 1986

[54] CARBON FIBERS HAVING IMPROVED SURFACE PROPERTIES AND A METHOD FOR THE PREPARATION THEREOF

[75] Inventors: Morinobu Endou, Nagano; Susumu Ueno, Ibaraki; Tatsuhiko Hongu, Kanagawa; Minoru Takamizawa, Tokyo, all of Japan

[73] Assignee: Shin-Etsu Chemical Co., Ltd., Tokyo, Japan

[21] Appl. No.: 558,845

[22] Filed: Dec. 6, 1983

[30] Foreign Application Priority Data

Dec. 6, 1982 [JP] Japan ................... 57-214303

[51] Int. Cl.$^4$ .............. B32B 9/00; D02G 3/00; B05D 3/06
[52] U.S. Cl. .................. 428/368; 428/408; 428/367; 428/375; 427/38; 427/113
[58] Field of Search ............. 428/367, 368, 375, 391, 428/408; 42/249, 228; 427/39, 38, 86, 113

[56] References Cited

U.S. PATENT DOCUMENTS

| | | | |
|---|---|---|---|
| 3,811,920 | 5/1974 | Galasso et al. | 428/368 |
| 3,925,577 | 12/1975 | Fatzer et al. | 428/408 |
| 4,315,968 | 2/1982 | Suplinskas et al. | 428/368 |
| 4,340,636 | 7/1982 | De Bolt et al. | 428/368 |
| 4,373,006 | 2/1983 | Galasso et al. | 428/368 |
| 4,401,687 | 8/1983 | Rosler et al. | 427/38 |
| 4,448,801 | 5/1984 | Fukuda et al. | 427/39 |

*Primary Examiner*—Marion E. McCamish
*Assistant Examiner*—Beverly Johnson

[57] ABSTRACT

The invention provides carbon fibers coated on the surface with a layer of an amorphous silicon carbide of the composition $Si_xC_y$, x and y each being a positive number with the proviso that the ratio y/x is in the range from 0.5 to 2.5, formed by the exposure of the carbon fibers to low temperature plasma generated in an atmosphere containing an organosilicon compound having no oxygen or chlorine atom directly bonded to the silicon atom in the molecule. The carbon fibers are imparted with greatly increased resistance against air oxidation at high temperatures as well as remarkably improved affinity or wettability with plastics and molten metals along with very low reactivity with molten metals so that the carbon fibers are useful as a reinforcing material in the composite materials of carbon fiber-reinforced plastics and metals.

7 Claims, 2 Drawing Figures

CARBON FIBERS HAVING IMPROVED SURFACE PROPERTIES AND A METHOD FOR THE PREPARATION THEREOF

BACKGROUND OF THE INVENTION

The present invention relates to a method for the preparation of carbon fibers with improved surface properties or, more particularly, to a method for the preparation of carbon fibers of which the surface has remarkably improved resistance against oxidation as well as greatly decreased reactivity with molten metals and the like when the carbon fibers are used as a reinforcing material in a metal-based composite material.

As is well known, carbon fibers are manufactured by the infusibilization and carbonization treatment of fibers or filaments of rayon, polyacrylonitrile, lignin, resinous pitch and the like material in an atmosphere of an inert gas and carbon fibers are widely used in recent years in a wide variety of industrial applications or, in particular, as a reinforcing material in a plastic- or metal-based composite material by virtue of their outstandingly high tensile strength and elastic modulus as well as excellent heat resistance. Carbon fibers are, however, of course not free from several problems and disadvantages including the limitation in the resistance against oxidation at high temperatures and low affinity of the surface thereof with plastics and metals as the matrix material of the composite materials. Moreover, carbon fibers may react with molten metals to form a metal carbide so that the use of carbon fibers as a reinforcing material in a metal-based composite material is largely limited. Several methods have of course been proposed to overcome the above described problems of carbon fibers by the surface treatment thereof but none of such methods is practically feasible due to the complicated processes to practice the method.

Turning now to a substitute for carbon fibers free from the disadvantages inherent to carbon fibers, fibers of silicon carbide developed recently constitute a class of promising materials having excellent resistance against oxidation at high temperatures, good wettability or affinity with plastics and metals and inertness to molten metals. A problem in silicon carbide fibers is the extreme expensiveness thereof as a result of the expensiveness of the starting material which is a very specific organosilicon polymer and the complicate process for the manufacturing including the synthesis of the organosilicon polymer, spinning thereof into filaments, infusibilization and calcination.

Therefore, it may be an idea that a high-performance, heat-resistant fibrous material of practical value would be obtained if a convenient and economical method is developed for providing carbon fibers with a cladding layer of silicon carbide although no such a method with practicability is known in the prior art.

SUMMARY OF THE INVENTION

It is therefore an object of the present invention to provide a novel and improved method for the preparation of carbon fibers with remarkably improved surface properties or, in particular, resistance against oxidation, wettability or affinity with metals and plastics and low reactivity with molten metals at high temperatures.

Another object of the invention is to provide an economical method for the preparation of carbon fibers having a cladding layer of silicon carbide on the surface to be imparted with excellent resistance against oxidation, good wettability or affinity with metals and plastics and low reactivity with molten metals inherent to silicon carbide fibers.

Thus, the method of the present invention for the preparation of carbon fibers with improved surface properties comprises subjecting carbon fibers to exposure to an atmosphere of plasma generated in a gas or vapor of an organosilicon compound having no halogen or oxygen atom directly bonded to the silicon atom in the molecular structure or a mixture thereof with a hydrocarbon compound to such an extent that the surface of the carbon fibers is coated with a layer of an amorphous and non-stoichiometric silicon carbide of the formula $Si_xC_y$, in which x and y are each a positive number interrelated to each other by a ratio of $y/x = 0.5$ to 2.5, formed by the plasma-induced decomposition and deposited on the surface of the carbon fibers.

DETAILED DESCRIPTION OF THE PREFERRED EMBODIMENTS

Figure 1:
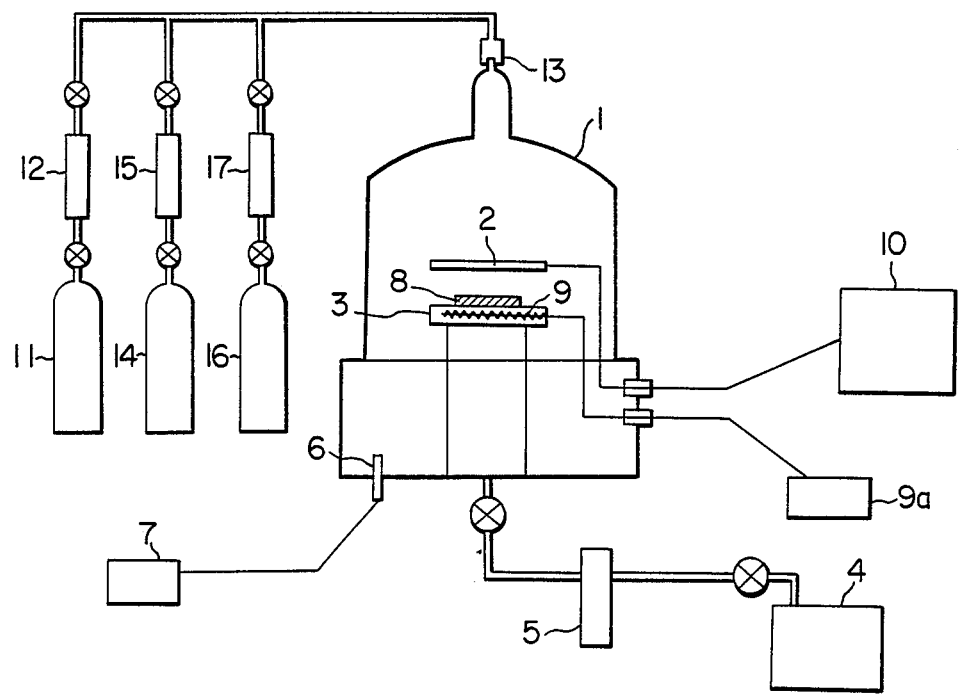
FIGS. 1 and 2 are each a schematic illustration of an apparatus for the plasma-treatment of carbon fibers either in a batch-wise process or in a continuous process, respectively.

The type of the carbon fibers to be subjected to the plasma treatment and imparted with greatly improved resistance against oxidation, increased wettability with or affinity to metals and plastics and decreased reactivity with molten metals is not particularly limitative including those prepared by the infusibilization and carbonization of organic fibers or filaments of polyacrylonitrile, rayon, pitch, lignin and the like as well as those prepared by the vapor-phase pyrolysis of a suitable organic compound. Further, the carbon fibers may be in the form of fluxes or strands of filaments, felt-like sheet or woven cloth.

On the other hand, the organosilicon compound introduced into a plasma chamber should be gaseous at room temperature or have a vapor pressure sufficient to sustain the plasma discharge. It is essential that the organosilicon compound contains no oxygen or chlorine atoms directly bonded to the silicon atoms since an organosilicon compound having such a linkage is poorly decomposable into silicon carbide. In this regard, suitable organosilicon compounds for the purpose are exemplified by silanes and polysilanes represented by the general formula $R_{2n+2}Si_n$, in which each R is a hydrogen atom or a monovalent hydrocarbon group selected from the class consisting of methyl, ethyl, propyl, vinyl and allyl groups but not all of the groups denoted by R are hydrogen atoms and n is an integer of 1, 2, 3 or 4, and silhydrocarbylene compounds represented by the general formula $R_3Si(-R^1-SiR_2)_mR$, in which R has the same meaning as defined above, $R^1$ is a hydrocarbylene group such as alkylene, e.g. methylene and ethylene, and phenylene groups and m is an integer of 1 or 2 as well as those organosililcon compounds having both of the polysilane linkage and the silhydrocarbylene linkage in the molecular structure. It is preferable that the organosilicon compound has at least one hydrogen atom directly bonded to the silicon atom in a molecule.

Several examples of the organosilicon compounds in conformity with the above described definition include, denoting a methyl group by the symbol Me, methylsilane MeSiH$_3$, dimethylsilane Me$_2$SiH$_2$, trimethylsilane Me$_3$SiH, diethylsilane (C$_2$H$_5$)$_2$SiH$_2$, propylsilane C$_3$H$_8$SiH$_3$, vinyl methylsilane (CH$_2$=CH)MeSiH$_2$, phenylsilane C$_6$H$_5$SiH$_3$, hexamethyldisilane Me$_3$Si—SiMe$_3$, 1,1,2,2-tetramethyldisilane Me$_2$HSi—SiMe$_2$H, 1,1,2,2,3,3-hexamethyltrisilane Me$_2$HSi—SiMe$_2$—SiMe$_2$H, bis(trimethylsilyl) methane Me$_3$Si—CH$_2$—SiMe$_3$, bis(dimethylsilyl) methane Me$_2$HSi—CH$_2$—SiMe$_2$H, bis(dimethylsilylmethyl) dimethyl silane Me$_2$HSi—CH$_2$—SiMe$_2$—CH$_2$—SiMe$_2$H, 1,2-di(dimethylsilyl) ethane Me$_2$HSi—CH$_2$—CH$_2$—SiMe$_2$H, di(dimethylsilyl) benzene Me$_2$HSi—C$_6$H$_4$—SiMe$_2$H, 1-dimethylsilymethyl-1,1,2,2-tetramethyl disilane Me$_2$HSi—CH$_2$—SiMe$_2$—SiMe$_2$H and the like. These compounds may be used either singly or as a mixture of two kinds or more. In particular, a mixture of methyl hydrogenpolysilanes obtained by the pyrolysis of a dimethylpolysilane of a relatively high molecular weight at 350° C. or higher may be used satisfactorily without further separation into the individual component compounds.

When plasma is generated in an atmosphere containing the above described organosilicon compounds in the presence of carbon fibers, the organosilicon compound is decomposed and converted into an amorphous and non-stoichiometric silicon carbide expressed by the formula Si$_x$C$_y$ or a composite of silicon carbide and carbon or silicon which is deposited and adsorbed on the surface of the carbon fibers to form a coating layer thereon. When the organosilicon compound contains a relatively large amount of hydrogen atoms directly bonded to the silicon atoms, the resultant coating layer of Si$_x$C$_y$ on the surface of the carbon fibers is rich in the content of silicon so that the molar ratio of y/x cannot be within the preferred range of 0.5 to 2.5 and no satisfactory results can be obtained for imparting the carbon fibers with improved surface properties. It is preferable in the case of using such an organosilicon compound that the vapor of the organosilicon compound is admixed with a gas or vapor of a hydrocarbon compound such as methane, ethane, propane, ethylene, acetylene, benzene, toluene and the like in such a ratio that the resultant coating layer deposited on the surface of the carbon fibers may have a composition of Si$_x$C$_y$ with the ratio of y/x in the range from 0.5 to 2.5.

In a typical procedure for practicing the method of the present invention, a plasma chamber containing the carbon fibers under treatment is first evacuated to purge the atmospheric oxygen followed by the application of an electric voltage between the electrodes of the plasma chamber to generated plasma inside the chamber while the vapor of the organosilicon compound and, optionally, the vapor of a hydrocarbon compound are continuously introduced into the plasma chamber to keep a constant atmospheric condition inside the plasma chamber. It is optional or preferable that the vapor of the organosilicon compound is diluted with a suitable carrier gas such as helium, hydrogen, argon, nitrogen, oxygen, air, carbon dioxide, carbon monoxide and the like from the standpoint of stabilizing the plasma discharge and further improving the properties of the silicon carbide coating layer formed by the plasma discharge and deposited on the surface of the carbon fibers.

As is well known in the art, plasma can readily be generated in a plasma chamber when the pressure inside the chamber is kept at 10 Torr or below or, preferably, in the range from 0.05 to 1 Torr and a high frequency electric power of 10 watts to 100 kilowatts at a frequency of 10 kHz to 100 MHz is supplied to the electrodes installed inside the plasma chamber. It is of course optional that the electrodes are installed outside the plasma chamber or may be replaced with a single high frequency work coil surrounding the plasma chamber. It is preferable that the carbon fibers contained in the plasma chamber are heated at an elevated temperature in order to promote uniform deposition of the silicon carbide formed by the plasma discharge on to the surface of the carbon fibers. The method for heating the carbon fibers is not particularly limitative and the carbon fibers may be heated directly by passing an electric current therethrough or may be placed on the grounded electrode of the plasma chamber which is heated by use of a heater element built therein. The temperature of the carbon fibers during the plasma treatment should be in the range from 50° to 500° C. or, preferably, from 100° to 400° C.

The effectiveness of the plasma treatment according to the inventive method to deposit a coating layer of amorphous silicon carbide of the formula Si$_x$C$_y$ and to increase the oxidation resistance and decrease the reactivity of the carbon fibers with molten metals largely depends on the composition of the silicon carbide expressed by the molar ratio of y/x. When the ratio of y/x is smaller than 0.5, no sufficient improvement can be expected in the physical properties of the carbon fibers while a coating layer of silicon carbide with a value of y/x larger than 2.5 contains a large amount of free carbon so that the oxidation resistance imparted to the carbon fibers would be poor. Therefore, the value of the ratio y/x should be in the range from 0.5 to 2.5 or, preferably, from 0.8 to 2.0. This value of the ratio y/x can be controlled by appropriately selecting the kind and the partial pressure of the organosilicon compound introduced into the plasma chamber, the mixing ratio thereof with the hydrocarbon compound, concentration of the carrier gas and other factors.

The thickness of the coating layer of the silicon carbide deposited on the surface of the carbon fibers should be in the range from 0.005 to 5 μm or, preferably, from 0.01 to 1 μm since the desired effect of the plasma treatment cannot be obtained with the thickness of the coating layer smaller than 0.005 μm while carbon fibers provided with a coating layer of a thickness larger than 5 μm have rather decreased tensile strength and elastic modulus. The thickness of the coating layer of silicon carbide can be controlled by suitably selecting the amounts or partial pressures of the organosilicon compound and the hydrocarbon compound and the length of the treatment time.

Figure 2:
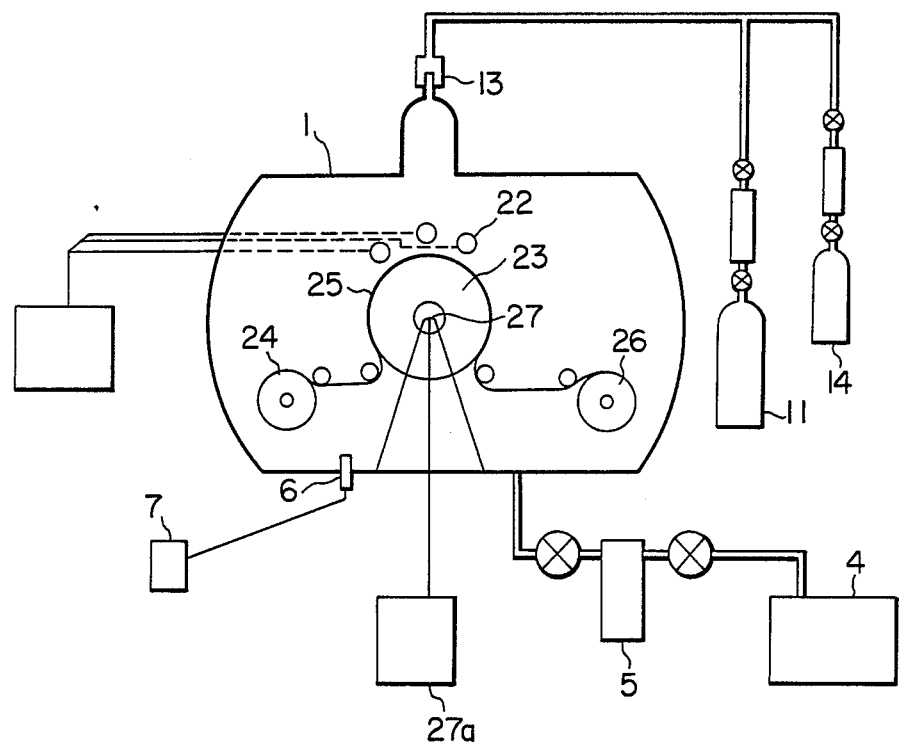

In the following, a practical procedure for carrying out the method of the present invention is described with reference to the accompanying drawing, of which FIGS. 1 and 2 are each a schematic illustration of the method undertaken in a batch process and in a continuous process, respectively. In FIG. 1, the plasma chamber 1 is provided with a power electrode 2 and a grounded electrode 3 installed inside and the plasma chamber 1 can be evacuated by means of a vacuum pump 4 installed outside the chamber 1 connected through a trap 5 down to a pressure of 10 Torr or below. The pressure inside the plasma chamber 1 can be determined and recorded by means of the sensor 6 connected to the Pirani vacuum gauge 7. The grounded electrode 3 serves as a table on which the carbon fibers 8 under treatment are mounted. The grounded electrode 3 has a heater 9 built therein and can be heated to a desired temperature by energizing the heater 9 with an outer power source 9a in order to keep the carbon fibers 8 at an elevated temperature. The power electrode 2 is connected to the ungrounded terminal of a high frequency generator 10. The organosilicon compound in a gaseous form contained in the vessel 11 is introduced into the plasma chamber 1 via a flow meter 12 and a nozzle 13 and supply of a high frequency electric power to the electrodes 2, 3 generates low temperature plasma in the atmosphere of this organosilicon compound under a suitable low pressure inside the plasma chamber 1 so that the organosilicon compound is decomposed to form silicon carbide $Si_xC_y$ which is deposited on the surface of the carbon fibers 8 as a coating film thereon. When the organosilicon compound is admixed or diluted with a hydrocarbon compound or a carrier gas, these gases contained in the vessels 14 and 16 are combined with the gas or vapor of the organosilicon compound through the flow meters 15 and 17, respectively, before the nozzle 13.

The apparatus for a continuous process illustrated in FIG. 2 has several rod-like power electrodes 22 held in parallel with the axis of a rotatable drum-like grounded electrode 23 and the continuous sheet-like carbon fiber material 25 held in the roll 24 is run on the rotatable drum-like grounded electrode 23 and wound up in the take-up roll 26 after being exposed to the atmosphere of the low temperature plasma. The rotatable grounded electrode 23 is also heated by means of a heater 27 built therein. In respects of the gas introduction and plasma generation, the apparatus in FIG. 2 is the same as in FIG. 1.

When the carbon fiber material is subjected to the plasma treatment in the above described manner, the carbon fibers are coated with an amorphous silicon carbide compound of the formula $Si_xC_y$ to be imparted with remarkably improved oxidation resistance at high temperatures in air along with the increase in the tensile strength and elastic modulus. Further, the carbon fibers are imparted with enhanced wettabillity or affinity with molten metals while the reactivity of the carbon fibers with molten metals such as aluminum is greatly reduced. Thus, the present invention provides a very convenient and economical method for the preparation of carbon fibers suitable as a reinforcing material in FRPs, FRMs and FRCs.

Following are the examples to illustrate the method of the present invention in further detail.

EXAMPLE 1

A 15 cm by 15 cm wide woven cloth of carbon fibers (Carbolon z-3, a product by Nippon Carbon Co.) was mounted on the grounded electrode of an apparatus similar to that illustrated in FIG. 1 and heated at 220° C. by means of the heater. The plasma chamber was evacuated by use of a vacuum pump and, when the pressure inside the chamber had reached 0.05 Torr, continuous introduction of vapor of 1,1,2,2-tetramethyl disilane was started so that the pressure inside the plasma chamber was kept constant at 0.2 Torr by the balance of the continuous evacuation and introduction of the vapor. Low temperature plasma was generated inside the plasma chamber under the above atmospheric conditions by supplying an electric power of 150 watts at a frequency of 13.56 MHz to the electrodes for 1 hour and then for additional 1 hour with the carbon fiber cloth reversed upside down. In the thus plasma-treated carbon fiber cloth, the carbon fibers were found to be coated with a surface film of 0.7 $\mu$m thickness composed of an amorphous silicon carbide of the composition $Si_xC_y$ with the ratio of y/x equal to 1.0.

The plasma-treated carbon fiber cloth was impregnated with an epoxy resin (BP-907, a product by American Cyanamid Co.) in such a resin pick-up that the carbon fiber content in the resin-carbon fiber composite was 65% by weight and the resin-impregnated carbon fiber cloth was shaped by lamination into a plate. The tensile strength of this shaped product was 220 kg/mm$^2$ as determined by the procedure specified in JIS K 7113 indicating a substantial increase over the corresponding value of 119 kg/mm$^2$ for a similar product shaped with a carbon fiber cloth before the plasma treatment. This result indicates that the affinity of the surface of the carbon fibers with the epoxy resin is greatly improved by the plasma treatment. The surface resistivity of the plasma-treated carbon fiber cloth was 20 ohm.

No substantial changes were noted in the appearance and mechanical strengths of the plasma-treated carbon fiber cloth even after heating in air at 800° C. for 24 hours while the same carbon fiber cloth before the plasma treatment was greatly oxidized by the same heat treatment and readily collapsed without retaining the form of cloth.

EXAMPLE 2

The same carbon fiber cloth of 15 cm by 15 cm wide as used in the preceding example was mounted on the grounded electrode of the same plasma-treatment apparatus and heated at 300° C. by means of the heater. The plasma chamber was evacuatd down to a pressure of 0.08 Torr followed by the continuous introduction of ethane gas to give an inside pressure of 0.15 Torr and then by the continuous introduction of bis(dimethylsilyl) methane to increase the inside pressure up to 0.25 Torr by the balance of the continuous evacuation and introduction of these two gases. Then low temperature plasma was generated inside the plasma chamber by supplying a high frequency electric power of 100 watts at a frequency of 13.56 MHz to the electrodes for 20 minutes followed by the same plasma treatment with the carbon fiber cloth reversed upside down. The carbon fibers of the thus plasma-treated carbon fiber cloth were found to be coated with a surface film of about 0.2 $\mu$m thickness composed of an amorphous silicon carbide of the composition $Si_xC_y$ with the ratio of y/x equal to 1.5.

The resin impregnation and shaping of the plasma-treated carbon fiber cloth to give a shaped product of which the content of the carbon fibers was 62% by weight were undertaken in the same manner as in the preceding example. The tensile strength of this shaped product was 205 kg/mm$^2$ showing a substantial increase over the corresponding value of 110 kg/mm$^2$ for a similar shaped product prepared with the same carbon fiber cloth before the plasma treatment. The surface resistivity of the plasma-treated carbon fiber cloth was 12 ohm.

The reactivity of the plasma-treated carbon fibers with a molten metal was examined by dipping the above plasma-treated carbon fiber cloth in a bath of molten aluminum metal kept at 680° C. for 1 hour followed by the examination of the cross section of the carbon fibers after cooling with a scanning electron miroscope. No noticeable changes were found in the configuration of the carbon fibers indicating a great decrease in the reactivity of the carbon fibers with molten aluminum.

EXAMPLE 3

The same carbon fiber cloth as used in the preceding examples having a length of 50 m in a roll was mounted in the plasma chamber of the continuous-process plasma treatment apparatus as illustrated in FIG. 2 and set to be wound up on the take-up roll after being contacted with the surface of the drum-like rotatable grounded electrode heated at 170° C. After evacuation of the plasma chamber to a pressure of 0.05 Torr, 1,1,2,2-tetramethyldisilane and a 1:1 by volume mixture of hydrogen and argon as a carrier gas were continuously introduced into the plasma chamber at rates of 500 ml/minute and 200 ml/minute, respectively, so that the inside pressure was kept constant at 0.12 Torr.

While the carbon fiber cloth was run and wound up at a velocity of 1 cm/minute, low temperature plasma was generated inside the plasma chamber by supplying a high frequency electric power of 3 kilowatts at a frequency of 110 kHz to expose a side of the running cloth to the plasma atmosphere followed by the plasma treatment of the other side of the cloth in just the same manner. The fibers of the thus plasma-treated carbon fiber cloth were found to be coated with a surface film of about 0.1 m thickness composed of an amorphous silicon carbide of the composition $Si_xC_y$ with the ratio of y/x equal to 1.1.

Resin impregnation and shaping of the plasma-treated carbon fiber cloth were undertaken in the same manner as in the preceding example to give a shaped product, in which the content of the carbon fibers was 60% by weight, having a tensile strength of 183 kg/mm² indicating a substantial increase over the corresponding value of 97 kg/mm² of a similar shaped product prepared of the same carbon fiber cloth before plasma treatment.

The oxidation resistance of the plasma-treated carbon fiber cloth was examined by heating the cloth in air at 800° C. for 24 hours not to find any substantial changes in the appearance and mechanical strengths of the cloth indicating a great improvement.

EXAMPLE 4

A batch-wise plasma treatment of a carbon filament (Torayca T-300A, a product by Toray Co.) having a tensile strength of 246 kg/mm² and chopped in 10 cm lengths was carried out in about the same manner as in Example 1. Thus, the chopped filaments were mounted on the grounded electrode heated at 300° C. and, after evacuation of the plasma chamber down to a pressure of 0.03 Torr, hydrogen gas was continuously introduced into the chamber to give a pressure of 0.12 Torr followed by the additional continuous introduction of an organosilicon compound in the gaseous form indicated in Table 1 into the plasma chamber together with or without a hydrocarbon gas so that the inside pressure was kept constant at 0.27 Torr. After a plasma treatment for 1 hour with generation of low temperature plasma inside the plasma chamber by supplying an electric power of 150 watts at a frequency of 13.56 MHz to the electrodes, the carbon filaments were found to be coated with a surface film of an amorphous silicon carbide of the composition $Si_xC_y$, of which the thickness of the surface film and the ratio of y/x were as shown in the table.

The tensile strength of the carbon filament was determined either as plasma-treated or after heating in air for 24 hours at 800° C. to give the results shown in the table. In Table 1, the Experiments No. 8 and No. 9 were undertaken for comparative purpose in which the ratio y/x of the amorphous silicon carbide was either larger than 2.5 or smaller than 0.5.

The organosilicon compounds used in Experiments No. 1 to No. 9 in Table 1 are shown in the table by the symbols I to VI which denote the following compounds.

I: Dimethylsilane
II: Methylsilane
III: 1,1,2,2-Tetramethyl disilane
IV: Bis(dimethylsilyl) methane

TABLE 1

| Experiment No. | Organosilicon compound (A) | Hydrocarbon compound (B) | (A)/(B) molar ratio | Film thickness of $Si_xC_y$, μm | y/x molar ratio in $Si_xC_y$ | Tensile strength, kg/mm² as plasma-treated | Tensile strength, kg/mm² after heating in air |
|---|---|---|---|---|---|---|---|
| 1 | I | Methane | 1/1 | 0.3 | 1.5 | 272 | 264 |
| 2 | I | None | — | 0.3 | 0.8 | 279 | 273 |
| 3 | II | Benzene | 1/0.2 | 0.35 | 1.3 | 295 | 280 |
| 4 | III | Ethylene | 1/0.5 | 0.80 | 1.4 | 269 | 256 |
| 5 | IV | Methane | 1/0.2 | 0.75 | 1.2 | 282 | 280 |
| 6 | V | None | — | 0.25 | 1.6 | 275 | 248 |
| 7 | VI | None | — | 0.55 | 1.8 | 276 | 240 |
| 8 | III | Benzene | 1/0.5 | 0.85 | 2.8 | 280 | 32 |
| 9 | II | None | — | 0.35 | 0.4 | 285 | 265 |

The reactivity of the plasma-treated carbon filaments were examined by dipping the filament in a bath of molten aluminum kept at 680° C. for 1 hour followed by the examination of the cross section thereof after cooling with a scanning electron microscope to find that the form of the filament could not be retained in Experiments No. 8 and No. 9 while substantially no changes were noted in the cross sectional configuration of the filament in each of the Experiments No. 1 to No. 7.

What is claimed is:

1. A carbon fiber having a coating layer on the surface formed of an amorphous silicon carbide of a composition expressed by the formula $Si_xC_y$, in which x and y are each a positive number with the proviso that the ratio of y/x is in the range from 0.5 to 2.5, said coating layer of silicon carbide being produced by exposing the carbon fiber to low temperature plasma generated in an atmosphere of a reduced pressure containing a gas or vapor of an organosilicon compound having no oxygen atom or halogen atom directly bonded to the silicon atom in the molecule.

2. The carbon fiber as claimed in claim 1 wherein the organosilicon compound is a silane or polysilane compound represented by the general formula $R_{2n+2}Si_n$, in which R is a hydrogen atom or a monovalent hydrocarbon group and n is a positive integer of 1 to 4, not all of the groups in a molecule denoted by the symbol R being hydrogen atoms.

3. The carbon fiber as claimed in claim 1 wherein the organosilicon compound is a silhydrocarbylene compound represented by the general formula $R_3Si(R^1-SiR_2)_mR$, in which R is a hydrogen atom or a monovalent hydrocarbon group, $R^1$ is a divalent hydrocarbylene group selected from the class consisting of methylene, ethylene and phenylene groups and m is 1 or 2.

4. The carbon fiber as claimed in claim 1 wherein the organosilicon compound is selected from the class consisting of methylsilane, dimethylsilane, trimethylsilane, diethylsilane, propylsilane, vinyl methylsilane, phenylsilane, hexamethyl disilane, 1,1,2,2-tetramethyl disilane, 1,1,2,2,3,3-hexamethyl trisilane, bis(trimethylsilyl) methane, bis(dimethylsilyl) methane, bis(dimethylsilylmethyl) dimethyl silane, 1,2-di(dimethylsilyl) ethane, di(dimethylsilyl) benzene and 1-dimethylsilylmethyl-1,1,2,2-tetramethyl disilane.

5. The carbon fiber as claimed in claim 1 wherein the gas or vapor of the organosilicon compound is admixed with a gas or vapor of a hydrocarbon compound selected from the class consisting of methane, ethane, propane, ethylene, acetylene, benzene and toluene.

6. The carbon fiber as claimed in claim 1 wherein the coating layer formed of the silicon carbide has a thickness in the range from 0.005 to 5 μm.

7. The carbon fiber as claimed in claim 1 wherein the carbon fiber is exposed to the low temperature plasma at a temperature in the range from 50° to 500° C.

* * * * *